US012766765B2

(12) United States Patent
Boufaida et al.

(10) Patent No.: US 12,766,765 B2
(45) Date of Patent: Oct. 20, 2026

(54) SUPPORTING POLE

(71) Applicant: Owens Corning Intellectual Capital, LLC, Toledo, OH (US)

(72) Inventors: Zakariya Boufaida, Chambery (FR); José María Rodriguez Ramirez, Puigpelat Tarragona (ES)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 321 days.

(21) Appl. No.: 18/553,592

(22) PCT Filed: Mar. 30, 2022

(86) PCT No.: PCT/US2022/022446
§ 371 (c)(1),
(2) Date: Oct. 2, 2023

(87) PCT Pub. No.: WO2022/216486
PCT Pub. Date: Oct. 13, 2022

(65) Prior Publication Data

US 2024/0181682 A1 Jun. 6, 2024

(30) Foreign Application Priority Data

Apr. 7, 2021 (EP) .................................... 21382292

(51) Int. Cl.
*B29C 41/04* (2006.01)
*B29C 41/22* (2006.01)
(Continued)

(52) U.S. Cl.
CPC .............. *B29C 41/04* (2013.01); *B29C 41/22* (2013.01); *B29C 41/46* (2013.01); *B29C 70/081* (2013.01);
(Continued)

(58) Field of Classification Search
CPC . F16L 9/12; B29C 41/22; B29C 41/46; B29C 70/081; B29C 70/083; B29C 70/16;
(Continued)

(56) References Cited

U.S. PATENT DOCUMENTS 3,150,219 A * 9/1964 Schmidt .................... F16L 9/12 264/258
3,820,573 A 6/1974 Carmody
(Continued)

FOREIGN PATENT DOCUMENTS

CH 506740 A 4/1971
DE 102007059817 A1 6/2009
(Continued)

OTHER PUBLICATIONS

Machine Translation EP0112934 (Year: 1984).*
(Continued)

*Primary Examiner* — Jennifer A Steele
(74) *Attorney, Agent, or Firm* — MacMillan, Sobanski & Todd, LLC

(57) ABSTRACT

A supporting pole for supporting objects at an elevated position, such as a supporting pole for supporting cables, wires and/or electrical components. The supporting pole is formed of one or more fiber reinforced plastic resin laminates, wherein the one or more laminates comprise: a first ply, the first ply comprising unidirectional fibers, the unidirectional fibers having a first Young's modulus, and a second ply, the second ply comprising chopped fibers, the chopped fibers having a second Young's modulus; wherein the first Young's modulus is greater than the second Young's modulus, and wherein the unidirectional fibers in the laminate are at least 70 wt % of the fibers in the laminate.

18 Claims, 2 Drawing Sheets

(51) Int. Cl.

| | |
|---|---|
| ***B29C 41/46*** | (2006.01) |
| ***B29C 70/08*** | (2006.01) |
| ***B29K 67/00*** | (2006.01) |
| ***B29K 105/10*** | (2006.01) |
| ***B29K 105/12*** | (2006.01) |
| ***B29K 309/08*** | (2006.01) |
| ***B29L 23/00*** | (2006.01) |
| ***B29L 31/00*** | (2006.01) |
| ***B32B 1/08*** | (2006.01) |
| ***B32B 27/08*** | (2006.01) |
| ***B32B 27/36*** | (2006.01) |

(52) U.S. Cl.
CPC ................ *B32B 1/08* (2013.01); *B32B 27/08* (2013.01); *B32B 27/36* (2013.01); *B29K 2067/00* (2013.01); *B29K 2105/105* (2013.01); *B29K 2105/12* (2013.01); *B29K 2309/08* (2013.01); *B29L 2023/22* (2013.01); *B29L 2031/766* (2013.01); *B32B 2250/02* (2013.01); *B32B 2250/244* (2013.01); *B32B 2260/021* (2013.01); *B32B 2260/046* (2013.01); *B32B 2262/101* (2013.01); *B32B 2307/54* (2013.01); *B32B 2307/7375* (2023.05); *B32B 2597/00* (2013.01)

(58) Field of Classification Search
CPC ....... B29C 70/20; B29C 70/323; B29C 41/04; B29K 2067/00; B29K 2105/105; B29K 2105/12; B29K 2309/08; B29K 2105/06; B29L 2023/22; B29L 2031/766; B32B 1/08; B32B 5/26; B32B 27/08; B32B 27/36; B32B 2250/02; B32B 2250/244; B32B 2260/021; B32B 2260/046; B32B 2262/101; B32B 2307/54; B32B 2307/7375; B32B 2597/00; Y10T 428/1362–1372
USPC ................................................ 428/36.1–36.3
See application file for complete search history.

(56) References Cited

U.S. PATENT DOCUMENTS

| | | | | |
|---|---|---|---|---|
| 4,097,626 A * | 6/1978 | Tennent | A63B 53/10 | 473/319 |
| 4,104,095 A * | 8/1978 | Shaw | B29C 70/82 | 156/149 |
| 4,173,670 A * | 11/1979 | VanAuken | B32B 1/08 | 138/131 |
| 4,515,547 A | 5/1985 | Rother et al. | | |
| 5,338,604 A * | 8/1994 | Yasui | A01K 87/00 | 428/113 |
| 2008/0268192 A1* | 10/2008 | Suzuki | F16L 9/123 | 428/36.3 |
| 2010/0112249 A1* | 5/2010 | Boyce | B29C 70/12 | 428/36.1 |

FOREIGN PATENT DOCUMENTS

| | | | |
|---|---|---|---|
| EP | 0112934 A1 * | 7/1984 | B29C 70/326 |
| GB | 1328116 A | 9/1970 | |

OTHER PUBLICATIONS

International Search Report and Written Opinion from PCT/US2022/022446 dated Jul. 12, 2022.
Chinese notification of the first office action, Application No. 202280029423.9, dated Dec. 25, 2025.
Brazilian Office Action, Application No. BR112023019291-9, dated Apr. 22, 2026.
Chinese Office Action, Application No. CN202280029423.9, dated May 20, 2026.

* cited by examiner

SUPPORTING POLE

CROSS-REFERENCE TO RELATED APPLICATIONS

This application is the U.S. national stage entry of PCT/US2022/022446, filed on Mar. 30, 2022, which claims priority to and the benefit of European Application No. 21382292.7, filed on Apr. 7, 2021, the entire contents of which are incorporated by reference herein.

TECHNICAL FIELD

The present invention relates to a supporting pole for supporting objects at an elevated position, such as a supporting pole for supporting cables, wires and/or electrical components. The present invention is also directed to a method of making the supporting pole, and to the use of a fiber reinforced plastic resin (FRPR) laminate, for example, for making a supporting pole.

BACKGROUND TO THE INVENTION

Supporting poles are typically used to support objects at an elevated position. For example, supporting poles may support cables, wires and/or electrical cables at an elevated position. An examples of a supporting pole is a utility pole used to support overhead power lines and/or various other utilities, such as electrical cable, fiber optic cable, and other telecommunication cables, along with related equipment, such as transformers and/or lighting.

Centrifugal casting is a technique which can be used to make supporting poles from fiber reinforced plastic resin laminates. In centrifugal casting, a mat of fibers is inserted into a mould. The mould is rotated, and the fibers move out to the walls of the mould due to centrifugal force. A liquid resin precursor is added to the mould, and the centrifugal force causes the resin to impregnate the fibers. The walls of the mould can be heated, which can cause polymerisation of the liquid resin precursor to form a resin.

Supporting poles can be made from other materials. For example, supporting poles can be made with materials such as steel, concrete, or wood.

SUMMARY OF THE INVENTION

At its most general, the present invention provides a fiber reinforced plastic resin laminate, and a supporting pole made from one or more of such laminates. The laminate may comprise a first ply and a second ply. The first ply may comprise unidirectional fibers. The second ply may comprise fibers which are oriented at an angle relative to (i.e. not parallel with) the unidirectional fibers, such as chopped fibers or fibers orientated at +/−30°, +/−45° or 90° relative to the unidirectional fibers. The unidirectional fibers may have a higher Young's modulus than the chopped fibers, and the unidirectional fibers may be at least 70 wt % of the fibers in the laminate. Such laminates may be strong and lightweight, and may be used to make strong, lightweight components, like supporting poles.

According to a first aspect, the present invention is directed to a supporting pole for supporting objects at an elevated position, such as a supporting pole for supporting cables, wires and/or electrical components, the supporting pole being formed of one or more fiber reinforced plastic resin laminates, wherein the one or more laminates comprise:

- a first ply, the first ply comprising unidirectional fibers, the unidirectional fibers having a first Young's modulus, and
- a second ply, the second ply comprising chopped fibers, the chopped fibers having a second Young's modulus;
- wherein the first Young's modulus is greater than the second Young's modulus, and
- wherein the unidirectional fibers in the laminate are at least 70 wt % of the fibers in the laminate.

In a particular embodiment, the unidirectional fibers may be substantially longitudinal along the supporting pole.

According to a second aspect, the present invention is directed to a fiber reinforced plastic resin laminate, wherein the laminate comprises:

- a first ply, the first ply comprising unidirectional fibers, the unidirectional fibers having a first Young's modulus, and
- a second ply, the second ply comprising chopped fibers, the chopped fibers having a second Young's modulus;
- wherein the first Young's modulus is greater than the second Young's modulus, and
- wherein the unidirectional fibers in the laminate are at least 70 wt % of the fibers in the laminate.

According to a third aspect, the present invention is directed to a method of making a supporting pole according to the first aspect, the method comprising centrifugal casting one or more fiber reinforced laminates of the second aspect to form the supporting pole.

According to a fourth aspect, the present invention is directed to a use of a fiber reinforced plastic resin laminate in the manufacture of a support pole, the fiber reinforced plastic resin laminate comprising:

- a first ply, the first ply comprising unidirectional fibers, the unidirectional fibers having a first Young's modulus, and
- a second ply, the second ply comprising chopped fibers, the chopped fibers having a second Young's modulus;
- wherein the first Young's modulus is greater than the second Young's modulus,
- wherein the unidirectional fibers in the laminate are at least 70 wt % of the fibers in the laminate.

The use of the fourth aspect may include centrifugal casting of the fiber reinforced plastic resin laminate.

DETAILED DESCRIPTION OF THE INVENTION

It has surprisingly been found that a supporting pole for supporting objects at an elevated position according to the present invention is strong and lightweight. This allows a supporting pole to be made using less material for a given strength.

The Supporting Pole

The supporting pole may be a utility pole. In particular embodiments, the supporting pole is a telecommunication (or telecoms) pole, a pole for carrying electrical power lines, or a pole for supporting electrical components at an elevated position.

In a particular embodiment, the supporting pole may be a tubular member. For example, the supporting pole may be a tubular member which is a conical frustrum, or a tube.

The supporting pole may be at least about 5 meters long. For example, the supporting pole may be at least about 7 meters long, or at least about 10 meters long. The supporting pole may be less than about 20 meters long, for example, less than about 15 meters long.

The supporting pole may be at least about 10 cm wide, wherein the width of the supporting pole is measured at the widest point of the support pole. The supporting pole may be at least about 15 cm wide, at least about 20 cm wide, or at least about 25 cm wide. The supporting pole may be less than about 50 cm wide, such as less than about 40 cm wide, or less than about 30 cm wide.

A first end of the supporting pole, such as a base of the supporting pole, may have a diameter of at least about 10 cm, for example, at least about 15 cm, at least about 20 cm, or at least about 25 cm. The first end of the supporting pole may have a diameter of less than about 50 cm, such as less than about 40 cm, or less than about 30 cm.

A second end of the supporting pole, such as a top of the supporting pole, may have a diameter of at least about 5 cm, for example, at least about 7.5 cm, or at least about 10 cm. The second end of the supporting pole may have a diameter of less than about 20 cm, such as less than about 15 cm.

The supporting pole may have an aspect ratio of at least about 10, where are the aspect ratio is the ratio of the length of the supporting pole to the width of the supporting pole. For example, the supporting pole may have an aspect ratio of at least about 20, of at least about 30, at least about 40, or at least about 50.

In a particular embodiment, the supporting pole may have an aspect ratio of at least about 10, and the supporting pole may be at least about 5 meters long.

The One or More Laminates

Disclosed herein is a fiber reinforced plastic resin laminate, wherein the laminate comprises:

- a first ply, the first ply comprising unidirectional fibers, the unidirectional fibers having a first Young's modulus, and
- a second ply, the second ply comprising chopped fibers, the chopped fibers having a second Young's modulus;
- wherein the first Young's modulus is greater than the second Young's modulus, and
- wherein the unidirectional fibers in the laminate are at least 70 wt % of the fibers in the laminate.

In an aspect of the present invention, a supporting pole is formed from one or more of the fiber reinforced plastic resin laminates. In a particular embodiment, the supporting pole is formed of more than one fiber reinforced plastic resin laminates.

In a particular embodiment, the fiber content of each laminate may be between about 45 wt % and about 60 wt %. For example, the fiber content of each laminate may be between about 50 wt % and about 55 wt %, such as about 53 wt %.

The supporting pole may comprise two or more laminates, and two or more of the laminates may alternate between first plies and second plies. For example, the second ply of a particular laminate may be arranged between the first ply of that laminate and the first ply of on adjacent laminate. The second ply of the innermost laminate may form an inside surface of the supporting pole.

In a particular embodiment, each laminate may be less than about 2 mm thick. For example, each laminate may be less than about 2.0 mm thick, less than about 1.5 mm thick, less than about 1.2 mm or about 1.20 mm thick, less than about 1.15 mm thick, less than about 1.10 mm thick, less than about 1.00 mm thick, or less than about 0.90 mm thick.

Each laminate may have a fabric grammage of less than about 1020 g/m$^2$. For example, each laminate may have a fabric grammage of less than about 975 g/m$^2$, less than about 950 g/m$^2$, less than about 925 g/m$^2$, less than about 900 g/m$^2$, or less than about 875 g/m$^2$.

First Ply

The first ply may comprise at least about 75 wt % of the fibers in each laminate. For example, the first ply may comprise at least about 78 wt % of the fibers in each laminate, at least about 80 wt % of the fibers in each laminate, at least about 83 wt % of the fibers in each laminate, at least about 85 wt % of the fibers in each laminate, or, in particular, at least about 88 wt % of the fibers in each laminate. The first ply may comprise up to about 90 wt % of the fibers in each laminate. The first ply may comprise about 90 wt % of the fibers in each laminate.

The first ply includes unidirectional fibers. In particular embodiments, the unidirectional fibers are the sole fibers of the first ply. In these embodiments, the laminate may comprise at least about 70 wt % of unidirectional fibers based on the total weight of fibers in the laminate. In particular embodiments, the laminate may comprise at least about 75 wt % of unidirectional fibers based on the total weight of fibers in the laminate, at least about 80 wt % of unidirectional fibers based on the total weight of fibers in the laminate, or at least about 85 wt % of unidirectional fibers based on the total weight of fibers in the laminate. In further embodiments, the laminate may comprise at least about 88 wt % of unidirectional fibers based on the total weight of fibers in the laminate. In particular embodiments, the laminate may comprise up to about or about 90 wt % of unidirectional fibers based on the total weight of fibers in the laminate.

The unidirectional fibers may be substantially longitudinal along the supporting pole. For example, the unidirectional fibers may be aligned at an angle of less than about 10° to the longitudinal axis of the supporting pole, such as an angle of less than about 9°, less than about 8°, less than about 7°, less than about 6°, less than about 5°, less than about 4°, less than about 3°, less than about 2°, or less than about 1.0°. The unidirectional fibers may be aligned along a helix or conical helix around the longitudinal axis of the supporting pole, and the unidirectional fibers may have a helix angle of less than about 10°, such as a helix angle of less than about 9°, less than about 8°, less than about 7°, less than about 6°, less than about 5°, less than about 4°, less than about 3°, less than about 2°, or less than about 1.0°.

The first Young's modulus (E) of the unidirectional fibers may be more than about 84 GPa. For example, the first Young's modulus may be more than about 86 GPa. The first Young's modulus may be from about 84 GPa to about 100 GPa, from about 84 GPa to about 90 GPa, from about 86 GPa to about 100 GPa, or in particular, from about 86 GPa to about 90 GPa. The first Young's modulus may be about 87.5 GPa.

The unidirectional fibers may have a tensile strength ($\sigma$) of more than about 4100 MPa. For example, the unidirectional fibers may have a tensile strength of more than about 4200 MPa, more than about 4300 MPa, more than about 4400 MPa, more than about 4500 MPa, or more than about 4600 MPa.

In particular, the unidirectional fibers may comprise glass fibers. For example, the unidirectional fibers may comprise high modulus glass fibers, such as H Glass from Owens Corning.

The first ply may comprise a fiber volume fraction (FVF) from about 25% to about 40%, such as from about 30% to about 35%.

The first ply in each laminate may be less than about 1.0 mm thick. For example, the first ply in each laminate may be less than about 0.95 mm thick, or less than about 0.90 mm thick.

The first ply in each laminate may have a fabric grammage of less than about 800 $g/m^2$. For example, the first ply in each laminate may have a fabric grammage of less than about 775 $g/m^2$, less than about 750 $g/m^2$, or less than about 725 $g/m^2$. The first ply may have a fabric grammage of at least about 600 $g/m^2$, such as a fabric grammage of at least about 625 $g/m^2$, about 650 $g/m^2$, or about 675 $g/m^2$.

Second Ply

The second ply in each laminate may be less than about 0.5 mm thick. For example, the second ply in each laminate may be less than about 0.4 mm thick, or less than about 0.35 mm thick.

The second ply in each laminate may have a fabric grammage of less than about 300 $g/m^2$. For example, the second ply in each laminate may have a fabric grammage of less than about 250 $g/m^2$, less than about 200 $g/m^2$, or less than about 150 $g/m^2$.

Chopped Fibers

The second Young's modulus (E) of the chopped fibers may be about 83 GPa or less. For example, the second Young's modulus may be from about 70 GPa to about 83 GPa, from about 75 GPa to about 83 GPa, or from about 80 GPa to about 83 GPa. The second Young's modulus may be about 82 GPa.

In particular, the chopped fibers may comprise glass fibers. The chopped fibers may comprise ECR glass fibers (ECR glass fibers are electrically insulating, E, and chemical resistant, CR, to alkali, water and acid). For example, the chopped fibers may comprise Advantex® fibers from Owens Corning.

Resin

The fiber reinforced plastic resin may comprise a polyester resin, an epoxy, or a vinyl ester. In a particular embodiment, the fiber reinforced plastic resin may be a polyester resin.

The plastic resin of the fiber reinforced plastic resin may have a density of from about 0.5 $g/cm^3$ to about 2 $g/cm^3$, such as from about 1 $g/cm^3$ to about 1.2 $g/cm^2$. The plastic resin of the fiber reinforced plastic resin may have a Poisson's ratio between about 0.2 and about 0.5, such as about 0.3 to about 0.4. The plastic resin of the fiber reinforced plastic resin may have a tensile strength of from about 40 MPa to about 80 MPa, such as from about 50 MPa to about 70 MPa. The plastic resin of the fiber reinforced plastic resin may have a Young's modulus of from about 2 GPa to about 5 GPa, such as from about 3 GPa to about 4 GPa. The plastic resin of the fiber reinforced plastic resin may have a density of about 1.11 $g/cm^3$, a Poisson's ratio of about 0.35, a Tensile strength of about 60 MPa, and a Young's modulus of about 3.5 GPa.

Particular Embodiments

In a particular embodiment, the first Young's modulus may be from about 84 GPa to about 100 GPa, and/or the second Young's modulus may be from about 70 GPa to about 83 GPa. For example, the first Young's modulus may be from about 86 GPa to about 100 GPa, and the second Young's modulus may be from about 75 GPa to about 83 GPa, or the first Young's modulus may be from about 86 GPa to about 90 GPa, and the second Young's moduls may be from about 80 GPa to about 83 GPa.

In a particular embodiment, the unidirectional fibers and the chopped fibers comprise glass fibers. For example, the unidirectional fibers may comprise H glass from Owens Corning, and the chopped fibers may comprise Advantex® from Owens Corning.

In a particular embodiment, the first ply in each laminate may have a fabric grammage of less than about 800 $g/m^2$, and the second ply in each laminate may have a fabric grammage of less than about 300 $g/m^2$. For example, first ply in each laminate may have a fabric grammage from about 650 $g/m^2$ to about 750 $g/m^2$, and the second ply in each laminate may have a fabric grammage from about 100 $g/m^2$ to about 200 $g/m^2$.

In a particular embodiment, the first Young's modulus is from about 84 GPa to about 100 GPa, and the second Young's modulus is from about 70 GPa to about 83 GPa, the first ply in each laminate has a fabric grammage of less than about 800 $g/m^2$, and the second ply in each laminate has a fabric grammage of less than about 300 $g/m^2$, the unidirectional fibers are substantially longitudinal along the supporting pole, and the laminate may comprise at least 85 wt % of unidirectional fibers based on the total weight of fibers in the first ply.

Centrifugal Casting

The method may comprise adding one or more mats of fibers to a mould. Each mat of fibers may be a mat of unidirectional fibers, or a mat of chopped fibers.

The method may comprise centrifugal casting each fiber reinforced plastic resin laminate sequentially. For example, the method may comprise centrifugal casting a first fiber reinforced plastic resin laminate, followed by centrifugal casting further fiber reinforced plastic resin laminates inside the first fiber reinforced plastic resin laminate. The method may comprise adding a first unidirectional fiber mat and a first chopped fiber mat to a mould, rotating the mould, and adding liquid resin precursor to the mould to centrifugally cast a first fiber reinforced plastic resin laminate, followed by adding a second unidirectional fiber mat and a second chopped fiber mat to the mould, rotating the mould, and adding further liquid resin precursor to the mould to centrifugally cast a second fiber reinforced plastic resin laminate. The method may further comprise casting further fiber reinforced plastic resin laminate in the same way.

The method may comprise centrifugal casting the one or more laminates simultaneously. For example, the method may comprise adding the unidirectional and chopped fibers of each laminate into a mould, and impregnating the unidirectional fibers and the chopped fibers in a single centrifugal casting. The method may comprise adding a first unidirectional fiber mat and a first chopped fiber mat to a mould, adding a second unidirectional fiber mat and a second chopped fiber mat to the mould, rotating the mould, and adding liquid resin precursor to the mould to centrifugally cast a first fiber reinforced plastic resin laminate and a second fiber reinforced plastic resin laminate.

The method may comprise centrifugal casting the first ply and the second ply of each layer separately. For example, the method may comprise inserting a mat of the unidirectional fibers of the first ply in the mould and impregnating the unidirectional fibers, followed by inserting a mat of the chopped fibers of the second ply inside the first ply and impregnating the chopped fibers with resin.

The method may comprise centrifugal casting of the first ply and the second ply simultaneously. For example, the method may comprise inserting a mat of the unidirectional fibers of the first ply and a mat of the chopped fibers of the second ply in the mould, and impregnating the unidirectional fibers and the chopped fibers with resin simultaneously.

When the method comprises adding multiple mats of fibers to the mould simultaneously, one or more of the mats may be spaced from at least one of the other the mats inside the mould before the mould is rotated. This may allow the mats to unwind in the mould more easily once the mould is rotated and the fibers move out to the walls of the mould due to the centrifugal forces. The method may comprise angling one or more of the mats in the mould relative to at least one of the other mats in the mould.

The method of may comprise heating a centrifugal casting mould to initiate thermosetting polymerisation of a liquid resin precursor to form the plastic resin of the fiber reinforced plastic resin laminate. The method may comprise complete polymerisation of a ply or laminate before the next ply or laminate is cast. The method may comprise partial polymerisation of a ply or laminate before the subsequent ply of laminate is cast. Partial polymerisation may allow the subsequent ply or laminate to adhere more strongly to the preceding partially polymerised ply or laminate.

The method may comprise centrifugal casting at a first rotational speed before the liquid resin precursor is added to the mould, and centrifugal casting at a second rotational speed after the liquid resin precursor is added to the mould. For example, the first speed may be higher than the second speed.

A pre-preg (or pre-impregnated) layer is a layer comprising fibers and a partially cured plastic resin. The method may comprise forming one or more of the fiber reinforced plastic resin laminates from a pre-preg layer. Similarly, the method may comprise forming the first ply and/or the second ply of one or more of the fiber reinforced plastic resin laminates from a pre-preg layer. The method may comprise adding a pre-preg layer to the mould, rotating the mould, and fully curing the resin in the pre-preg layer, thereby forming a first ply, a second ply, or a laminate.

The method may comprise forming a pre-preg layer comprising unidirectional fibers, and/or a pre-preg layer comprising chopped fibers. For example, the method may comprise forming a pre-preg layer by impregnating a mat of fibers with a liquid resin precursor and partially but not completely curing the resin, optionally wherein the fibers are unidirectional fibers and/or chopped fibers.

The method may comprise observing the mats of fibers, and determining that the liquid resin precursor has completely impregnated the fibers once the mats have become shiny in appearance. For example, the method may comprise determining that the liquid resin precursor has completely impregnated the fibers once the fibers turn from obaque to shiny. A shiny surface is once which reflects light because it is smooth.

Use of the Laminate

The use may comprise using the fiber reinforced plastic resin laminate to form at least part of a supporting pole, such as a supporting pole of the first aspect. For example, the fiber reinforced plastic resin laminate may form a laminate in the supporting pole.

BRIEF DESCRIPTION OF THE FIGURES

Embodiments and experiments illustrating the principles of the invention will now be discussed with reference to the accompanying figures.

DETAILED DESCRIPTION OF THE FIGURES

Figure 1:
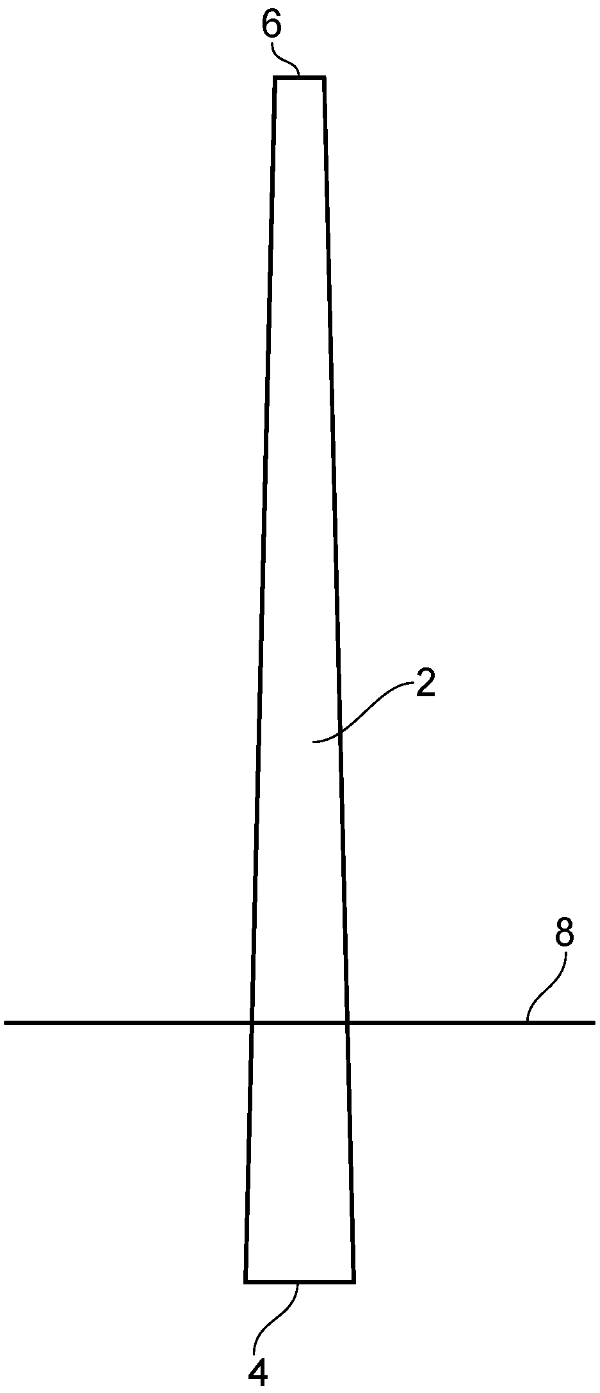
FIG. 1 shows a supporting pole.

FIG. 1 shows a supporting pole 2. The supporting pole 2 has a base 4 and a top 6. The base 4 has a diameter of 25 cm, and the top 6 has a diameter of 11.5 cm. The supporting pole 2 is eight meters tall, from the base to the top. The supporting pole 2 is buried in the ground 8 to a depth of 150 cm.

Figure 2:
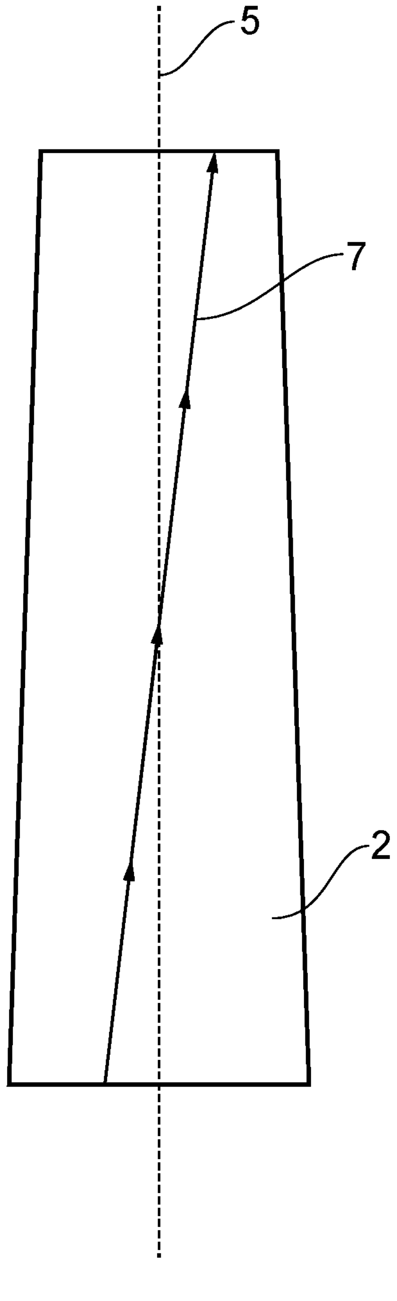
FIG. 2 shows an orientation of unidirectional fibers, relative to the supporting pole.

FIG. 2 shows part of a supporting pole 2. The supporting pole 2 has a longitudinal axis 5. The unidirectional fibers in the first ply of each laminate in the supporting pole 2 are aligned along line 7. The unidirectional fibers are aligned at an angle relative to the longitudinal axis 5 of the supporting pole 2. This angle is approximately 5 degrees. It will be understood that when the supporting pole is a tubular member, line 7 will actually form a helix of conical helix around the supporting pole.

Computational Modelling

Computational modelling was performed to optimise the design of the fiber reinforced plastic resin laminates which form the supporting pole.

Composite laminate theory (CLT) was used to predict the mechanical performances of the fiber reinforced plastic resin laminate comprising unidirectional fibers and chopped fibers. The mechanical description of the first ply comprising unidirectional fibers was done using micromechanical models available on Helius composite software, and the mechanical description of the second ply comprising chopped fibers (also called the chopped strand mat layer, or CSM) was done using a homogenization model.

The model of the fiber reinforced plastic resin laminate was built into Abaqus finite element analysis (FEA) solution. The FEA modeling inputs are set up in the following order.

- Define the geometry design
- Define the laminate properties
- Define the stacking sequence
  - Number of laminates and their thickness
  - Assignment of properties to each ply of the one or more laminates
  - Choice of a discrete reference system giving the direction and the orientation of the fiber in the 3D pole structure
- Define the mesh
- Assign the loadings and boundary conditions.

For all modeling scenarios a fiber weight fraction of 53% is used.

Geometry Design

The geometry of the model supporting pole is created as a 3D shell surface model and the thickness will be set in the design phase of the laminate. The model supporting pole is a truncated cone, as shown in FIG. 1.

Definition of Laminate Properties

Two plies were separately defined, a first ply and a second ply. The first ply comprises unidirectional fibers which are aligned along the longitudinal axis of the supporting pole, and the second ply comprises fibers which are not parallel with the unidirectional fibers, such as chopped fibers or fibers orientated at +/−30°, +/−45° or 90° relative to the unidirectional fibers. For each ply, failure properties which were calculated using Helius were also implemented in the Abaqus FEA code. The properties of the plies are shown in Table 1. In the following table, "12", "13" and "23" relate to shearing modulus in planes defined by the "1", "2" and "3" direction. The "1" direction is parallel with the unidirectional fibers in the first ply. The "2" direction is the transverse direction perpendicular with the unidirectional fibers in the first ply (in laminate plane). The "3" direction is the transverse direction perpendicular with the unidirectional fibers in the first ply (through the thickness of the laminate). In the table below: "12" denotes the shearing modulus in 12 plane (12 is the plane of the laminate); "13" denotes the shearing modulus in 13 plane (13 is a plane orthogonal to the laminate plane); and "23" denotes the shearing modulus in 23 plane (23 is a plane orthogonal to the laminate plane).

TABLE 1

| | Longitudinal Young's modulus (MPa) | Transversal Young's modulus (MPa) | Poisson's Ratio | Shear modulus 12 (MPa) | Shear modulus 13 (MPa) | Shear modulus 23 (MPa) |
|---|---|---|---|---|---|---|
| Second ply | 11769 | 15888 | 0.33333 | 4413 | 4413 | 4413 |
| First ply | 27587 | 6230 | 0.31 | 2130 | 2130 | 2044 |

3D Mesh Definition

To mesh the 3D shell geometry, 14546 quadratic shell elements (S4R) were used with an approximate element size of 20 mm. This allows a good compromise between high mesh refinement quality and computational time. To predict supporting pole deflection with high accuracy, both the 2nd order elements to prevent high mesh distortion and the hourglass control algorithm to better capture the flexural effects were used.

Loading and Boundary Conditions

A static analysis was used. The boundary conditions were defined by locking the bottom 150 cm of the supporting pole in place (to simulate the bottom 150 cm of the supporting pole being buried in the ground, as shown in FIG. 1) and applying a loading displacement of 2200 N at a reference point located 15 cm from the top of the supporting pole. The failure force and deflection were measured from the reference point.

Under this loading, the maximum deflection of the supporting pole must not exceed 650 mm. For a failure test, the ultimate force must be at least 3300 N.

Laminate Analysis Results

The fiber reinforced plastic resin laminates of the supporting pole are one of the key parameters influencing the mechanical performances of the supporting pole. Two kinds of fiber reinforced plastic resin laminates were considered, those comprising Advantex® fibers, and those comprising H glass and Advantex® fibers. The resin in all the laminates was polyester. The mechanical properties of the materials are given in Table 2.

TABLE 2

| | | Modulus | | Tensile Strength | Density |
|---|---|---|---|---|---|
| | Name | E (GPa) | ν | σ (MPa) | ρ (g/cm³) |
| Fibers | Advantex ® | 82 | 0.3 | 4050 | 2.61 |
| | H glass | 87.5 | 0.3 | 4635 | 2.59 |
| Matrix | Polyester | 3.24 | 0.35 | 76 | 1.20 |

The flexural resistance of the supporting pole is mainly driven by the first ply comprising the unidirectional fibers. The flexural resistance is therefore mainly driven by the longitudinal modulus of the laminate along the fiber direction, denoted Ex. The buckling resistance is mainly driven by the presence of layers with off axis fibers (such as the second ply comprising chopped fibers, or plys comprising+/−30°, +/−45° or 90° fibers, relative to the unidirectional fibers) and therefore by a combination of the transverse modulus, Ey, and Ex components. It is necessary to find a good compromise between Ex values and Ey values that allow for a supporting pole with the necessary specifications.

Laminate properties (Ex and Ey) of different laminates are given in Table 3. The results showed that a fabric configuration with a 0° layer (a first ply comprising unidirectional fibers) associated with a second ply with chopped fibers presents the best mechanical performance because of the compromise between deflection and buckling resistances. It offers a high value of Ex (defection resistance) and Ey (buckling resistance). Furthermore, the introduction of H glass as the unidirectional fibers allows additional improvement, mainly in the Ex component, for a better flexural resistance.

TABLE 3

| | Prior art | Example 1 | Example 2 | Example 3 | Example 4 | Example 5 |
|---|---|---|---|---|---|---|
| Fiber | | [0°/chopped] Advantex ® | [0°/chopped] 0° = H glass Chopped = Advantex ® | [0°/90°] H glass | [0°/+−45°] H glass | [0°/+−30°] H glass |
| Ex (GPa) | 22 | 26.37 | 27.57 | 25.21 | 25.25 | 27.78 |
| Ey (GPa) | | 12.55 | 12.60 | 14.79 | 8.53 | 7.36 |
| σx (MPa) | 400 | 580 | 590 | | | |

Supporting poles made from laminates with 0° fibers (unidirectional fibers) and chopped fibers were analysed with FEA. As described above, the FEA model predicts both deflection and failure force. The FEA analysis was used to determine reduced fabric grammage that still meet the performance requirements (ultimate failure force of 3300 N, and less than 650 mm deflection when the supporting pole is subjected to a force of 2200 N 15 cm from the top of the supporting pole). In the FEA analysis, the fiber content of the first ply was fixed at 16.45 kg. The results of the FEA analysis are shown in Table 4.

TABLE 4

| | Ex 1 | Ex 2 | Ex 3 | Ex 4 | Ex 5 | Ex 6 | Ex 7 | Ex 8 |
|---|---|---|---|---|---|---|---|---|
| First ply fibers (0°/unidirectional) | | Advantex ® | | | | H glass | | |
| Second ply fibers (chopped) | | Advantex ® | | | | Advantex ® | | |
| First ply (0° fibers) grammage (g/m$^2$) | | 720 | | | | 720 | | |
| Second ply (chopped fibers) grammage (g/m$^2$) | 300 | 249 | 198 | 147 | 300 | 249 | 198 | 147 |
| Supporting pole weight (kg) | 40.7 | 38.7 | 36.7 | 34.6 | 40.7 | 38.7 | 36.7 | 34.6 |
| Supporting pole weight reduction (relative to weight of Example 1) | 0% | 5% | 10% | 15% | 0% | 5% | 10% | 15% |
| Deflection under 2200 N (mm) | 580 | 609 | 642 | 679 | 553 | 582 | 614 | 649 |
| Failure force criterion (N) | 6321 | 5670 | 5044 | 4473 | 6422 | 5752 | 5130 | 4551 |
| Cost saving (relative to Ex 1) | 0% | −5% | −10% | −15% | +4% | −1% | −6% | −11% |

Examples 1~4 use Advantex® fibers in the first ply and the second ply. Examples 2 and 3 both offer a reduction in material cost (relative to Example 1) whilst passing the supporting pole requirements. Example 4 offers greater material cost reduction, but fails the deflection test.

Examples 5-8 use H glass in the first ply and Advantex® in the second ply. Using H glass in the first ply improves the mechanical performance of the supporting poles (deflection and failure force). This is due to the higher Young's modulus and failure strength of the laminate along the 0° fiber direction. Using H glass in the first ply instead of Advantex® decreases the deflection by 4.7%, from 580 mm in Example 1 to 553 mm in Example 5. Example 8 has a 15% reduction in the total laminate grammage (first ply and second ply) relative to Example 1, but still achieves a deflection value of 649 mm and a failure force of 4551 N, which meet the requirements for the mechanical properties. Example 8 offers an 11% material cost reduction (compared to Example 1) and presents much better mechanical performance comparing to Example 4, which used Advantex® for the first ply and has an equivalent total laminate grammage. Example 8 is the lightest and cheapest supporting pole which meets the required mechanical properties, but it has a deflection value close to the maximum allowed for a supporting pole. Example 7 offers a 6% reduction in material cost, and easily meets the mechanical properties required of the supporting pole. A supporting pole comprising H glass in the first ply, with a second ply fabric grammage between that of Example 7 (198 g/m$^2$) and Example 8 (147 g/m$^2$) may provide the highest cost reduction whilst maintaining a margin for error in the mechanical properties.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A supporting pole for supporting an object at an elevated position, the supporting pole being formed of one or more fiber reinforced plastic resin laminates, wherein the one or more laminates comprise:

a first ply comprising unidirectional fibers, the unidirectional fibers having a first Young's modulus, and a second ply comprising chopped fibers, the chopped fibers having a second Young's modulus;

wherein the first Young's modulus is greater than the second Young's modulus, wherein the unidirectional fibers in the laminate are at least 70 wt % of the fibers in the laminate, and wherein the first Young's modulus is in the range of 84 GPa to 100 GPa, and wherein the second Young's modulus is in the range of 70 GPa to 83 GPa.

2. The supporting pole of claim 1, wherein the first Young's modulus is in the range of 86 GPa to 90 GPa.

3. The supporting pole of claim 1, wherein the unidirectional fibers in the laminate are up to 90 wt % of the fibers in the laminate.

4. The supporting pole of claim 1, wherein the unidirectional fibers are substantially longitudinal along the supporting pole.

5. The supporting pole of claim 1, wherein a fiber content of each laminate is in the range of 45 wt % and 60 wt % of the laminate.

6. The supporting pole of claim 1, wherein the supporting pole has an aspect ratio of at least 10.

7. The supporting pole of claim 1, wherein the one or more fiber reinforced plastic resin laminates includes a first laminate and a second laminate;

wherein the first laminate is arranged adjacent to the second laminate; and wherein the second ply of the first laminate is disposed between the first plies of the first and second laminates.

8. The supporting pole of claim 1, wherein the one or more fiber reinforced plastic resin laminates includes a plurality of fiber reinforced plastic resin laminates, wherein a first fiber reinforced plastic resin laminate forms an outermost layer of the plurality of laminates and forms an outer surface of the supporting pole, and at least some of the other fiber reinforced plastic resin laminates are arranged to the interior of the first fiber reinforced plastic resin laminate, and at least some of the other fiber reinforced plastic resin laminates each extend along part of the length of the supporting pole.

9. The supporting pole of claim 1, wherein the unidirectional fibers comprise glass fibers.

10. The supporting pole of claim 1, wherein a plastic resin of the one or more fiber reinforced plastic resin laminates is a polyester resin.

11. A fiber reinforced plastic resin laminate comprising:

a first ply comprising unidirectional fibers, the unidirectional fibers having a first Young's modulus, and a second ply comprising chopped fibers, the chopped fibers having a second Young's modulus;

wherein the first Young's modulus is greater than the second Young's modulus, and wherein the unidirectional fibers in the laminate are at least 70 wt % of the fibers in the laminate, and wherein the first Young's modulus is in the range of 84 GPa to 100 GPa, and wherein the second Young's modulus is in the range of 70 GPa to 83 GPa.

12. A method of making a supporting pole formed of one or more fiber reinforced plastic resin laminates, wherein the one or more laminates comprise a first ply comprising unidirectional fibers, the unidirectional fibers having a first Young's modulus, and a second ply comprising chopped fibers, the chopped fibers having a second Young's modulus, wherein the first Young's modulus is greater than the second Young's modulus, wherein the unidirectional fibers in the laminate are at least 70 wt % of the fibers in the laminate, wherein the first Young's modulus is in the range of 84 GPa to 100 GPa, and wherein the second Young's modulus is in the range of 70 GPa to 83 GPa, the method comprising centrifugal casting the one or more laminates to form the supporting pole.

13. The method of claim 12, the method comprising centrifugal casting a first fiber reinforced plastic resin laminate, followed by centrifugal casting at least one further fiber reinforced plastic resin laminate inside the first fiber reinforced plastic resin laminate.

14. The method of claim 12, the method comprising heating a centrifugal casting mold to initiate thermosetting polymerization of a liquid resin precursor to form a plastic resin of the one or more fiber reinforced plastic resin laminates.

15. The method of claim 12, the method comprising centrifugal casting the first ply and the second ply of each of the one or more fiber reinforced plastic resin laminates separately.

16. The supporting pole of claim 1, wherein the second Young's modulus is in the range of 80 GPa to 83 GPa.

17. The supporting pole of claim 1, wherein the supporting pole is at least 5 meters long.

18. The supporting pole of claim 1, wherein the chopped fibers comprise glass fibers.

* * * * *